Nov. 15, 1960  F. J. YODICE  2,960,367
SLIDE-DOME HATCH FOR TANKS
Filed March 23, 1959  3 Sheets-Sheet 1
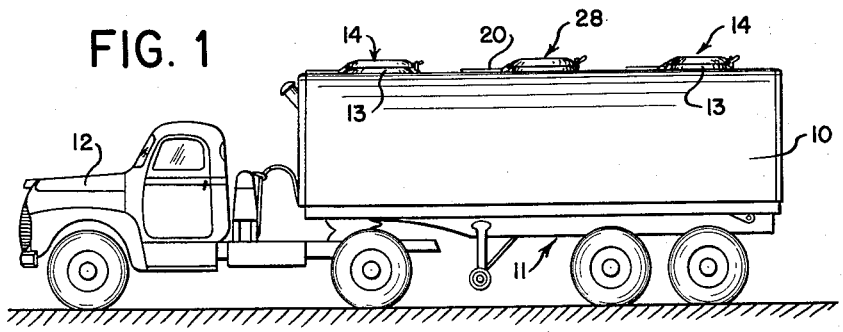
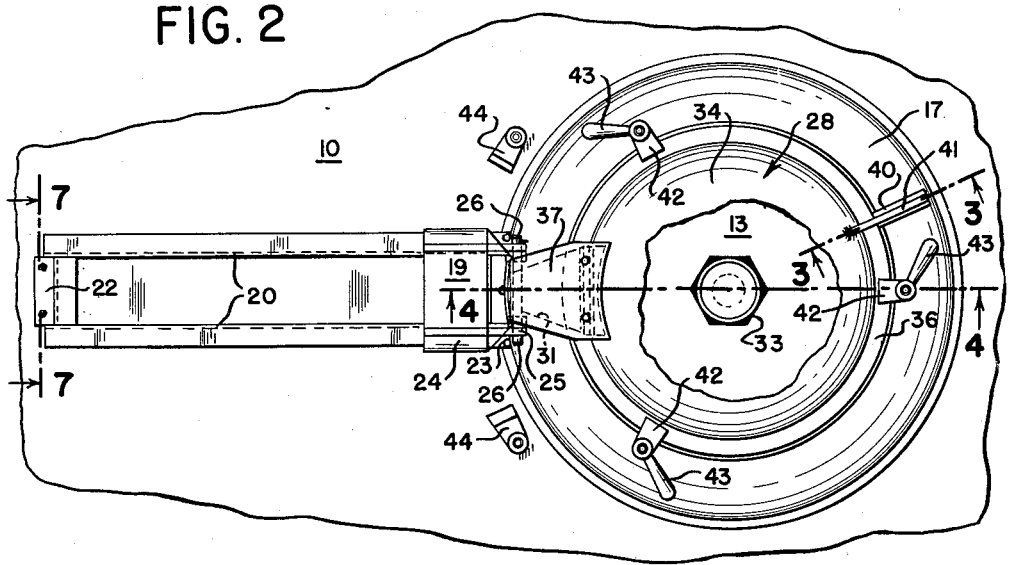
INVENTOR.
Frank J. Yodice
ATTORNEYS Nov. 15, 1960 F. J. YODICE 2,960,367
SLIDE-DOME HATCH FOR TANKS
Filed March 23, 1959 3 Sheets-Sheet 2

INVENTOR.
Frank J. Yodice
BY
ATTORNEYS

Nov. 15, 1960  F. J. YODICE  2,960,367
SLIDE-DOME HATCH FOR TANKS
Filed March 23, 1959  3 Sheets-Sheet 3

INVENTOR
Frank J. Yodice
BY
ATTORNEYS

United States Patent Office 2,960,367
Patented Nov. 15, 1960

2,960,367

SLIDE-DOME HATCH FOR TANKS

Frank J. Yodice, Morris Plains, N.J.
(350 5th Ave., New York 1, N.Y.)

Filed Mar. 23, 1959, Ser. No. 801,103

6 Claims. (Cl. 298—17)

The present invention relates to hatch covers for tanks, and more particularly to improvements in hatch covers adapted especially for, but not necessarily limited to, use in connection with mobile tank bodies, such as tank trucks.

Mobile tank carriers, which may be truck bodies or semi-trailers, for example, are conventionally provided at the top with one or more hatch openings of relatively large size (e.g., 18 inches in diameter), through which ready access may be had to the interior of the tank. The hatch openings are used for filling the tank body, and also to provide access for cleaning the interior of the tank.

It is a conventional practice of carriers of liquid materials, dry chemicals, etc., to transport different types of materials in the same tank body. Thus, for example, a load of molasses may be carried in one direction while a load of liquid sugar may be carried on the return trip. Accordingly, after the tank body is discharged of its contents of one type, the interior of the body may be hosed out with steam and/or hot water, to ready the body to receive a different material.

Conventionally, the hatch openings of a mobile tank body are provided with hatch and dust covers, pivoted at the edge of the opening, which may be opened to provide the desired access to the interior of the body. The hatch cover closes directly over the opening and seals it, but usually is provided with a suitable vent opening to accommodate the passage of air. An independently movable dust cover is adapted to be received over the top of the hatch cover, to enclose and protect it. Means, such as a rubber flap valve, are associated with the dust cover to provide for the flow of air to the hatch cover, as necessary, to accommodate the necessary venting.

After discharging a load of material, the carrier conventionally opens the dust and hatch covers and cleans the interior of the tank body by steam, hot water, etc. Then, in order to dry out the interior of the tank, the covers usually are left open while the carrier travels to the site of its next loading. Frequently, this practice results in substantial damage to the covers and/or the tank body, since the opened covers project high above the normal outline of the tank body, causing the driver to misjudge his required overhead clearances. Such occurrences, resulting in one or both of the opened covers snagging an overhead obstruction, are a source of substantial maintenance expense to truck owners. In addition, breakage of the cover hinges may be hazardous to the safety of the drivers and other workers, as it has been known to occur that a broken cover has fallen off the tank body and caused injury to personnel.

In accordance with the present invention, a novel and improved slide-dome hatch assembly is provided in which the hatch cover or covers are pivoted on a hinge bracket mounted for sliding movement on the tank body. The cover or covers of the new assembly may be pivoted to opened positions, in the usual manner, for filling or inspection of the tank, for example, where it is intended to reclose the covers prior to starting a trip. However, where the covers are to remain open during the trip in order, for example, to permit a recently cleaned tank to be dried out, the cover and hinge assembly may be shifted bodily away from the hatch opening in a horizontal direction. This enables the hatch to be maintained in an open condition while keeping the cover or covers flat against the top of the tank body, where it is impossible for the covers to be snagged by an overhead obstruction providing normal clearance.

Another important feature of the invention resides in the provision of an improved hatch cover assembly of the type above described, in combination with a tiltable tank body, as for example of the general type shown and described in my copending application Ser. No. 715,578, filed February 17, 1958, for "Convertible Tank Carrier." Thus, where the tank body is tilted at a substantial angle, for filling or discharging of contents, covers of a conventional type will slam shut by gravity.

For a better understanding of the above and other advantageous features of the invention, reference should be made to the following detailed description and to the accompanying drawings, in which:

Fig. 1 is an elevational view of a semi-trailer tank body incorporating the hatch covers of the invention;

Fig. 2 is an enlarged, plan view, with parts broken away, of the improved cover assembly incorporated in the tank body of Fig. 1;

Figure 4:
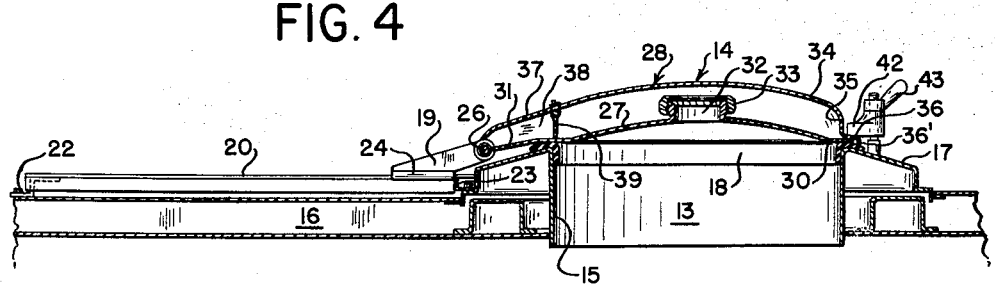
Figure 5:
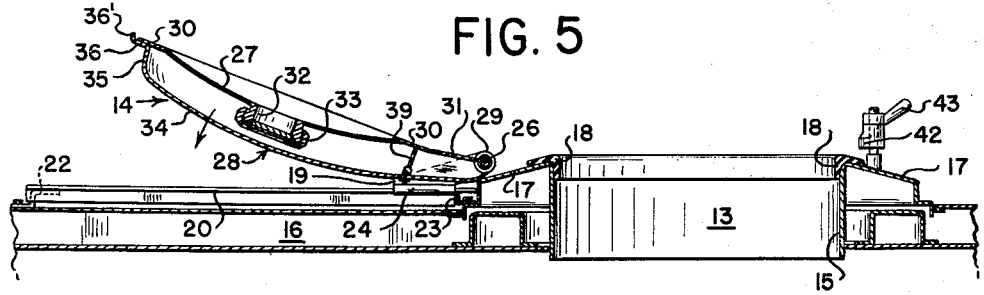
Figure 6:
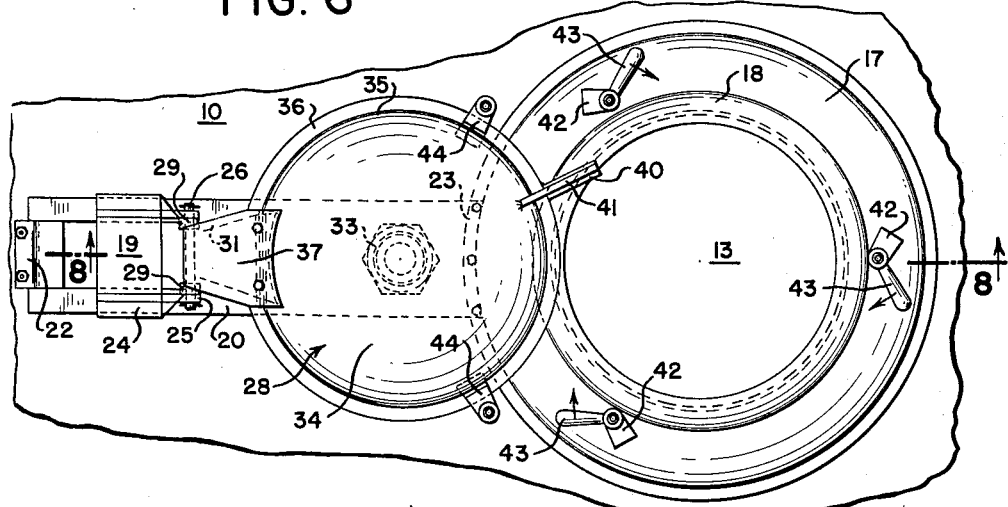
Figure 7:
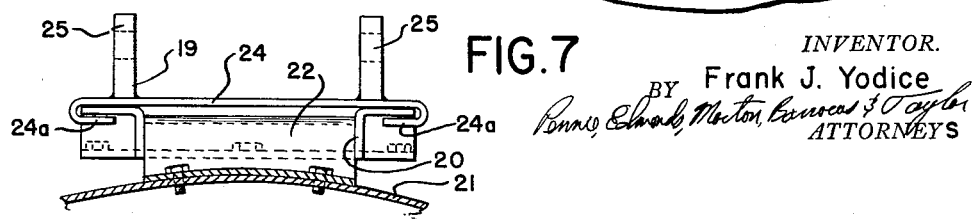
Figure 8:
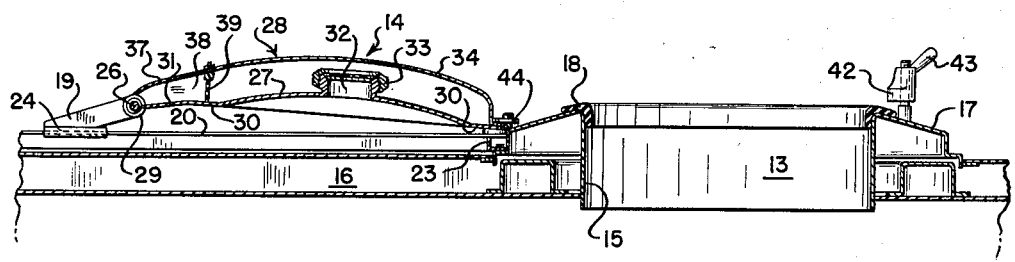

Figs. 3 and 4 are fragmentary, cross-sectional views taken generally along lines 3—3 and 4—4, respectively, of Fig. 2;

Fig. 5 is a fragmentary, cross-sectional view similar to Fig. 4, showing the cover of the new assembly hinged to an open position;

Fig. 6 is a top plan view similar to Fig. 2, showing the covers removed horizontally from the hatch opening;

Fig. 7 is an enlarged, fragmentary, cross-sectional view taken generally on line 7—7 of Fig. 2;

Fig. 8 is a cross-sectional view taken on line 8—8 of Fig. 6; and

Figure 9:
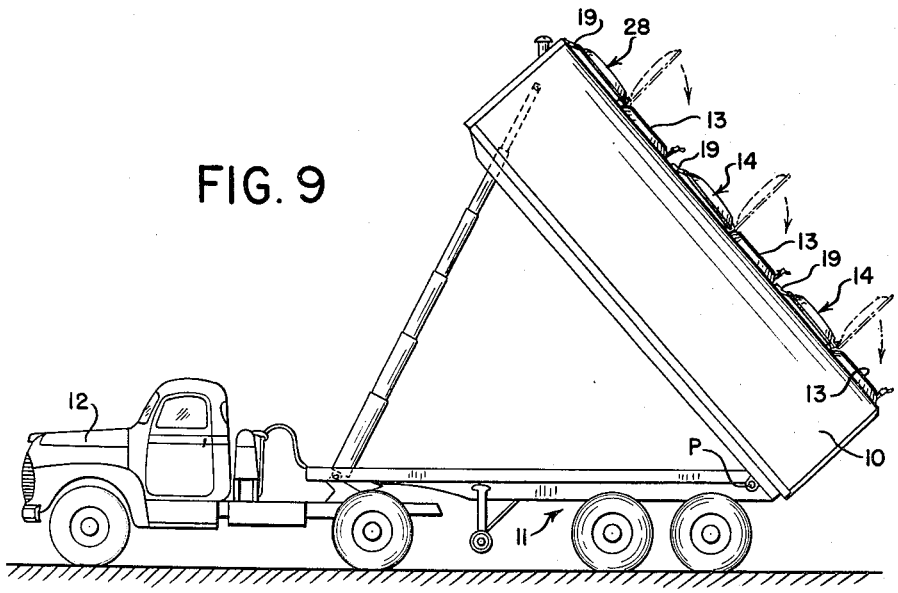

Fig. 9 is an elevational view of the semi-trailer tank body of Fig. 1, with the tank tilted and the covers open.

Referring now to the drawings, the numeral 10 designates generally a tank body of a semi-trailer 11 drawn by a tractor 12. The tank body 10 may, in general, be of conventional design, provided with a plurality of hatch openings 13 and cover assemblies 14, or the body may be of the type described in my before mentioned copending application.

As shown best in Fig. 4, for example, the hatch opening 13 may be formed by a short, tubular section 15 extending through and above the upper wall assembly 16 of the tank body and having a peripheral flange 17. Disposed about the upper end of the tube 15 and extending a short distance out along the peripheral flange 17 is an annular sealing member 18, which may be formed of rubber or other suitable resilient material.

Mounted adjacent the hatch opening 13 is a hinge bracket 19 which, in accordance with the invention, is mounted for sliding movement toward and away from the opening 13 by means of rails 20. As seen best in Fig. 7, the rails 20 are disposed in spaced parallel relation along the upper wall 21 of the tank, being secured to the tank by suitable means such as brackets 22, 23. The guide rails 20 advantageously may be formed of angle sections, each having a leg disposed in a horizontal plane. The hinge bracket 19 includes a base section 24 which extends over the tops of the guide rails and has end portions 24a bent around and extending beneath the horizontal legs of the rails, so that the hinge bracket is effectively locked against movement other than longitudinally of the guide rails. Advantageously, the guide rails 20 are disposed longitudinally of the tank body 10 and extend forwardly (or rearwardly, if desired) from the hatch opening with which they are associated.

In the illustrated form of the invention, the hinge bracket 19 comprises a pair of spaced arms 25 which support a rod 26. The rod 26, in turn, constitutes a hinge pin for a hatch cover 27 and dust cover 28, the dust cover being supported near the ends of the pin by bushings 29 and the hatch cover being supported between the bushings.

The hatch cover 27 is generally circular in form and is provided about its periphery with a flange 30 adapted to seat upon the annular sealing element 18. A tab 31 extends radially from the flange 30 to connect the cover 27 to the hinge pin 26. In accordance with usual practice, the hatch cover 27 is provided with a suitable vent passage 32 having associated therewith a closure member 33. The closure member may be in the form of a threaded member engaging external threads on the vent passage 32 and adjustable thereon to control the flow of air through the vent passage.

The dust cover 28 likewise is advantageously generally circular in form, being provided with a central dome portion 34 surrounded by axially and radially extending flange portions 35, 36. The radial flange 36 is positioned to overlie the flange 30 of the hatch cover, when the covers 27, 28 are closed, as shown in Fig. 4, and the flange 36 is provided about its outer edge with a downturned lip 36' which surrounds the outer edge of the hatch cover flange 30. A tab 37 extends from the dome portion of the dust cover to the bushings 29 to connect the dust cover to the hinge pin. Advantageously, the tab 37 has side walls 38 extending downward, substantially to the tab 31 of the hatch cover. The walls 38 do not fit closely with the tab 31, however, so that air access openings are provided to the space between the covers 27, 28.

Advantageously, a rubber flap valve element 39 is mounted on the dust cover 28, at the base of the tab 37, and extends downward into contact with the flange 30 of the hatch cover, when the covers are closed. The rubber valve member 39 partially seals off the air space between the covers, but provides for the flow of air into or out of the space when the pressure differential between the air in the space and the ambient air exceeds a predetermined amount.

As shown best in Figs. 2 and 3, the respective hatch and dust covers 27, 28 are provided with radially extending handles 40, 41 arranged so that one overlies the other, the two handles being spaced apart a relatively short distance, vertically. Accordingly, it is convenient to grip both handles simultaneously, with one hand, to open or close the separate covers as a single unit.

Conventional means, such as clamping lugs 42, spaced about the edge of the sealing element 18, may be provided to clamp the cover assembly in place. Thus, when the covers are closed, as shown in Fig. 4, the lugs 42 may be swung over the top of the dust cover flange 36 and brought to bear forcibly thereon by means of hand nuts 43.

To open the covers 27, 28, the hand nuts 43 are loosened and the clamping lugs 42 are swung out of the way, as shown in Fig. 6. If it is desired to open the covers temporarily, the handles 40, 41 may be gripped and the covers pivoted on the hinge pin 26 to an open position, as shown in Fig. 5. However, if it is desired to leave the covers open during a trip, or when the tank is tilted, as shown in Fig. 9, the handles 40, 41 are merely lifted slightly and pushed forward, to slide the entire assembly including the covers and the hinge bracket 19 forward along the rails 20 to an offset position as shown in Fig. 6 and as shown in Fig. 8. In this respect, the base portion 24 of the hinge bracket advantageously is positioned forward of the hinge pin 26 to avoid binding of the bracket on the rails 20 when the covers are pushed forward. Thus, in a typical assembly, for a hatch opening of about 18 inches in diameter, the hinge pin 26 advantageously is disposed about 1½ inches above the rails 20 and about 3 inches forward of the center of the hinge bracket base 24.

To support the covers in offset position for travel, or when the tank is raised, a pair of brackets 44 are mounted on the top wall of the tank body forward of the hatch opening. The brackets 44 have U-shaped openings, defined by upper and lower arms, which face toward the center of the cover assemblies, when the covers are in offset position. In the illustrated apparatus, the covers are engaged with the supports 44 by sliding the covers forward, beyond the brackets, while the covers are raised above the brackets, and then sliding the covers rearward a short distance, guiding the flanges 30, 36 thereof into the U-shaped openings of the brackets. Generally, it is not necessary to secure the offset covers in the brackets 44, as by providing clamping means, it being understood, however, that such means may be provided readily if desired.

Advantageously, when the new cover assembly is used in combination with a tiltable tank carrier, as shown in Fig. 9, the covers slide to retracted positions in a direction away from the pivot axis P of the tank. Accordingly, gravity will tend to keep the covers locked in the supports 44.

The new slide-dome hatch cover assembly represents a substantial departure from known practice in the trucking industry and results in substantial advantages to the trucker. Heretofore, recurring maintenance costs of a relatively substantial nature have resulted from the periodic snagging of open hatch cover assemblies on overhead obstructions. Thus, it is routine practice for tank carriers to travel with the cover assemblies open, to allow the tank to dry out after a cleaning operation, for example. In such cases, the covers project far above the normal outline of the rig, causing drivers to misjudge the required overhead clearance and snag the cover assemblies. Such an occurrence is especially likely where a driver returns over a route identical to that used in making a shipment with the cover assemblies closed.

With the new covers, travel with the hatches open is accommodated by merely sliding the cover assembly horizontally to an offset position, substantially flat against the upper surface of the tank. In such cases, the required overhead clearance is no greater than with the covers closed.

The new cover assembly is particularly advantageous when used in combination with a convertible tank carrier of the type described in my before mentioned co-pending application, where the tank periodically is raised to a tilted position for receiving or discharging contents. Thus, conventional covers, hinged back to upright positions, as shown in broken lines in Fig. 9, for example, will tend to fall shut by gravity when the tank body is raised. The new cover assembly, however, is locked in flat, offset position by the supports 44 and is not affected by raising and lowering of the tank body.

It should be understood that the specific form of the invention herein illustrated and described is intended to be representative only, as certain changes may be made therein without departing from the clear teachings of the disclosure. Accordingly, reference should be made to the following appended claims in determining the full scope of the invention.

I claim:
1. In combination with a tank having a hatch opening therein, a hatch cover for said opening, a hinge bracket engaging said hatch cover and providing for pivoting movement thereof between open and closed positions, and slide means running along the top of said tank and mounting said hinge bracket for sliding movement on said tank a predetermined distance toward and away from said hatch opening, said predetermined distance and said pivoting movement being great enough for said hatch cover to rest substantially flat against said slide means.

2. The combination of claim 1, in which supports are mounted on said tank on opposite sides of said slide means for engaging and supporting said hatch cover.

3. The combination of claim 1, in which the slide means is disposed longitudinally of the tank and positioned forward of the hatch opening.

4. The combination of claim 1, which includes a dust cover pivoted on said hinge bracket and movable between open and closed positions, said dust cover has a lip adapted, when said dust and hatch covers are in closed positions, to overlie the rim of said hatch cover.

5. The combination of claim 4, in which said covers are provided with handles extending generally radially therefrom, and the handle for said dust cover overlies the handle for said hatch cover substantially directly, whereby said handles may be gripped together for simultaneous removal of said covers.

6. The combination of claim 1, in which the tank is a truck body, said tank is mounted for pivoting movement about a pivoting axis, and means are provided for tilting the tank by pivoting movement about said pivoting axis for discharging contents, said cover being slidable to a retracted position in a direction away from the pivoting axis of the tank.

References Cited in the file of this patent

UNITED STATES PATENTS

| | | |
|---|---|---|
| 639,014 | Bradley | Dec. 12, 1899 |
| 1,706,064 | Hummer | Mar. 19, 1929 |
| 2,160,477 | Kramer | May 30, 1939 |
| 2,750,055 | Huffines | June 2, 1956 |